United States Patent [19]

Crofts

[11] 4,345,799

[45] Aug. 24, 1982

[54] BEARING ASSEMBLY

[75] Inventor: Brian Crofts, Littleover, England

[73] Assignee: Rolls-Royce Limited, London, England

[21] Appl. No.: 233,372

[22] Filed: Feb. 11, 1981

[30] Foreign Application Priority Data

Apr. 8, 1980 [GB] United Kingdom ............... 8011470

[51] Int. Cl.³ .............................................. F16C 33/66
[52] U.S. Cl. ...................................... 308/187; 38/188; 308/201; 308/215; 308/217
[58] Field of Search .............. 308/187, 201, 217, 215, 308/188, 189 R, 218

[56] References Cited

U.S. PATENT DOCUMENTS

| | | | |
|---|---|---|---|
| 3,121,597 | 2/1964 | Moran | 308/201 |
| 3,529,875 | 9/1970 | McKee | 308/201 |
| 4,192,560 | 3/1980 | Hartnett | 308/201 |
| 4,265,496 | 5/1981 | Kofink | 308/187 |

*Primary Examiner*—Lenard A. Footland
*Attorney, Agent, or Firm*—Cushman, Darby & Cushman

[57] ABSTRACT

A rolling element bearing comprises two bearing races between which is disposed a cage including rolling elements, the radially innermost cylindrical surface of the cage including oil reservoirs and the inner race including lips which during operation of the bearing contact the oil within the reservoirs whereby the speed of the cage is adapted to be controlled by the inner race.

6 Claims, 2 Drawing Figures

BEARING ASSEMBLY

This invention relates to rolling element bearings and more particularly to such bearings suitable for use in high speed applications such as for example gas turbine engines.

It is well known to use rolling element type bearings in gas turbine engines; either to support a rotatable engine component from a stationary structure or alternatively used as an intershaft bearing to support a rotatable engine component from a further rotatable component. Such bearings usually comprise a radially inner race, a radially outer race and a plurality of rolling elements arranged therebetween. The rolling elements being retained in their respective locations between the races by means of a bearing cage.

All such rolling element bearings can, under certain operating conditions suffer a disadvantage in that the rolling elements may have insufficient load upon them to ensure that they run at epicyclic speed and may therefore skid. Such skidding can obviously be detrimental to the effectiveness of operation of the bearing as it may cause both high bearing race and rolling element wear and also overheating of the bearing.

In the case of an intershaft bearing in which the radially outer bearing race runs at a higher speed than the inner race, the rolling elements are held in firm contact with the outer race due to centrifugal force to a greater degree than a static outer race. This results in the rolling elements and cage tending to run at the outer race speed and some sliding occurs between the rolling elements and radially inner race.

Alternatively in an intershaft bearing in which the inner race runs faster than the outer race or in a bearing having a static outer race, inadequate load will result in the rolling elements and cage slowing down below epicyclic speed. Here again sliding occurs between rolling elements and inner race.

The well known solution to this problem is to ensure that there is a closer clearance between the cage and the inner race, then between the cage and the outer race. Thus the lubricating oil introduced into the gap between the radially inner race and the cage sets up a differential viscous drag between the bearing cage and the inner and outer face which favors the inner race. There is therefore a net force which tends to slow the cage down to a value which is nearer the true epicyclic rolling speed of the rolling elements and hence reduce the speed of sliding between the rolling elements and the inner race. However this system suffers a disadvantage in that the oil introduced into the gap between the radially inner race and the cage tends to be forced out very rapidly due to the centrifugal effect thus reducing the efficiency of the system.

An object of the present invention is to provide a rolling element bearing in which the aforementioned disadvantage is substantially overcome.

According to the present invention a rolling element bearing comprises a radially inner bearing race, a radially outer bearing race, and a plurality of rolling elements arranged within a bearing cage situated between the races, the radially innermost cylindrical surface of the cage including at least one oil reservoir consisting of an annular recess, and the radially outermost cylindrical surface of the innermost race including at least one radially extending lip arranged adjacent to at least one reservoir, and which lip during operation of the bearing contacts the oil within the reservoir whereby the cage speed is adapted to be controlled by the inner race.

Preferably the bearing cage includes two oil reservoirs both of which are located within the innermost cylindrical surface of the cage on either side of the array of rolling element bearings.

Furthermore the radially innermost bearing race includes two radially extending lips each of which is arranged adjacent to one of the oil reservoirs.

According to a further aspect of the invention axially extending oil transfer grooves may be provided within the radially innermost cylindrical surface of the cage such that oil may be supplied to one of the reservoirs and then transferred to the other reservoir through the transfer grooves.

Preferably oil is continuously supplied to the at least one reservoir from which it is subsequently passed from to lubricate the bearing.

For better understanding of the invention an embodiment thereof will be more particularly described by way of example only and with reference to the accompanying drawings in which.

Figure 1:
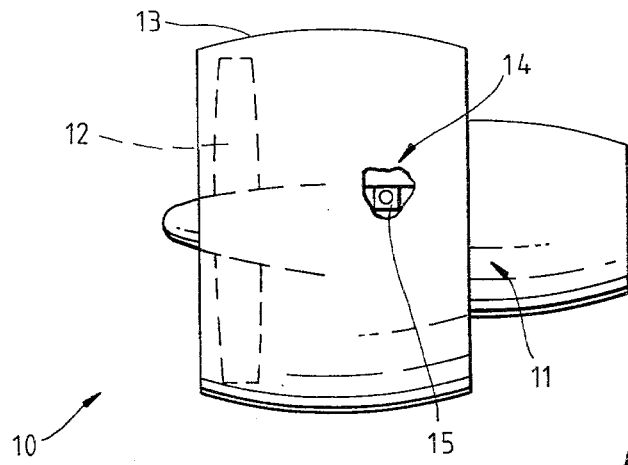
FIG. 1 shows a side view of a ducted fan type gas turbine engine including a partly broken-away casing portion disclosing a diagrammatic view of an embodiment of the present invention.

Referring to the drawings a gas turbine engine shown generally at 10 comprises a main core engine shown generally at 11 which serves to drive the fan 12 which is rotatably mounted within the fan duct 13. The engine also includes a broken away casing portion 14 within which is shown a diagrammatic view of a main engine bearing 15 made in accordance with an embodiment of the present invention.

Figure 2:
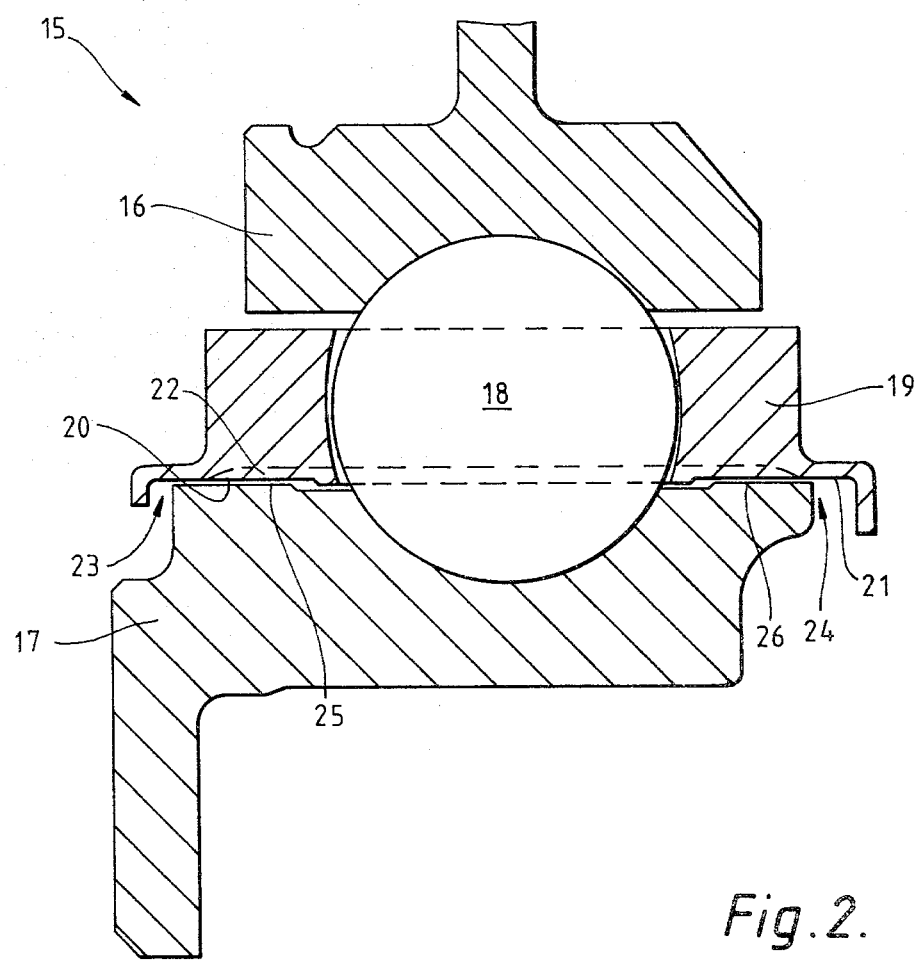
FIG. 2 shows an enlarged cross-sectional view in greater detail of the embodiment shown diagrammatically at FIG. 1.

FIG. 2 of the drawings shows an enlarged cross-sectional view of the bearing 15 shown diagrammatically at FIG. 1. The bearing comprises a radially outer race 16, a radially inner race 17 having interposed therebetween a plurality of ball bearing type rolling elements one of which is shown at 18 which are constrained within a bearing cage 19.

The bearing cage 19 includes on its radially innermost cylindrical surface two annular depressions 20 and 21 which serve to form out reservoirs when the bearings is in operation. A series of axially extending channels one of which is shown in broken lines at 22 are also provided within the radially inner cylindrical surface of the bearing cage 19. The channels 22 serve to convey oil from one reservoir to the other when the bearing is used in a location where it is only possible to provide an oil feed to one side of the bearing.

During operation of the bearing 15 a supply of oil is provided to pass through either of the annular spaces 23 and 24 which are formed between the radially innermost bearing race 17 and the cage 19. Alternatively the oil may be supplied to both the spaces 23 and 24 simultaneously.

After passing through the annular spaces 23 and 24 the oil will collect with the recesses 20 and 21 forming the reservoirs due to centrifugal force acting upon it. However when the reservoirs become full the oil will continue to be supplied therefore the excess oil will spill from the reservoirs and therefore serve to lubricate the rolling bearing element 18, the bearing races, and cages etc.

As a result of the upstanding lips 25 and 26 coming into contact with the oil trapped within the reservoirs 20 and 21 a frictional drag will be imposed upon the cage 19 therefore serving to ensure that its rotational speed is changed to a speed nearer to that of the radially innermost bearing race 17.

Optimisation of the drag can be achieved by controlling the arc of contact of the lips 25 and 26 with the oil trapped in the recesses 20 and 21. These arcs of contact are formed by the cage moving eccentric to the inner race into a controlled depth of oil and they may cause sufficient drag upon the cage to control its speed.

Alternatively a full 360° arc of contact may be achieved by the lips 25 and 26 with the oil. This is achieved by encouraging the inner race to expand radially more than the cage. As an example such radial growth can be assisted by ensuring that the inner cage is made a relatively large interference fit on its respective shaft during assembly.

It will be readily appreciated by those skilled in the art that whilst the invention particularly relates to a bearing suitable for use within a gas turbine engine the invention is in no way restricted to such an application as such a bearing could be used for many high speed applications. Furthermore such an arrangement could equally well made use of roller or needle roller bearings as an alternative to ball bearings depending upon the use for which the bearings is intended.

I claim:

1. A rolling element bearing comprising a radially inner bearing race, a radially outer bearing race and a plurality of rolling elements arranged within a bearing cage situated between the two races, the radially innermost cylindrical surface of the cage including at least one oil reservoir consisting of an annular recess, the radially outermost cylindrical surface of the innermost race including at least one radially extending lip arranged adjacent to at least one reservoir, and which lip during rotation of the bearing contacts the oil within the reservoir whereby the cage speed is adapted to be controlled by the inner race.

2. A rolling element bearing as claimed in claim 1 in which the bearing cage includes two oil reservoirs both of which are located within the innermost cylindrical surface of the cage on either side of the array of rolling element bearings.

3. A rolling element bearing as claimed in claim 1 in which the radially innermost bearing race includes two radially extending lips each of which is arranged adjacent to one of the oil reservoirs.

4. A rolling element bearing as claimed in claim 1 in which axially extending oil transfer grooves are provided within the radially innermost cylindrical surface of the cage such that oil may be supplied to one of the reservoirs and then transferred to the other reservoir through the transfer grooves.

5. A rolling element bearing as claimed in claim 1 in which oil is continuously supplied to at least one reservoir from which it is subsequently passed to lubricate the bearing.

6. A rolling element bearing as claimed in claim 1 for use in supporting a gas turbine engine main shaft.

* * * * *